J. T. ROBIN.
PROJECTION OR DISTRIBUTION OF LIGHT.
APPLICATION FILED SEPT. 14, 1918.
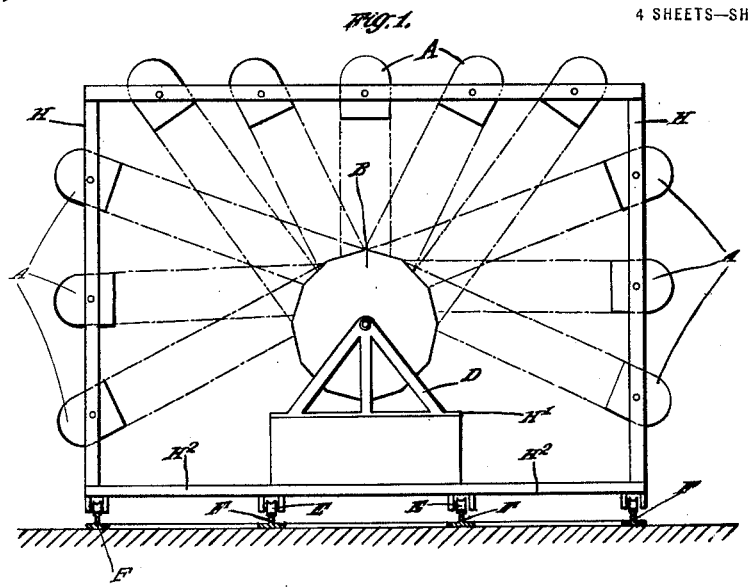
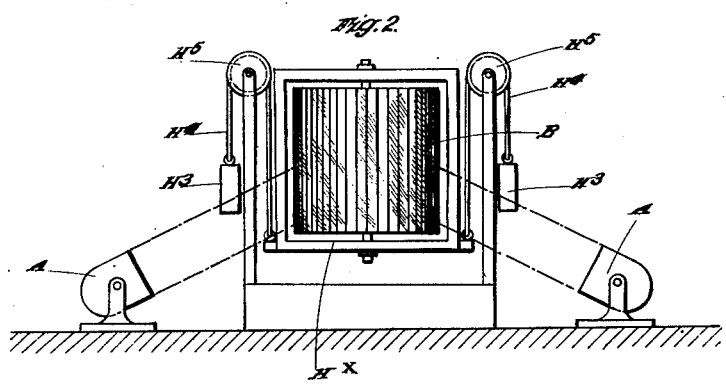
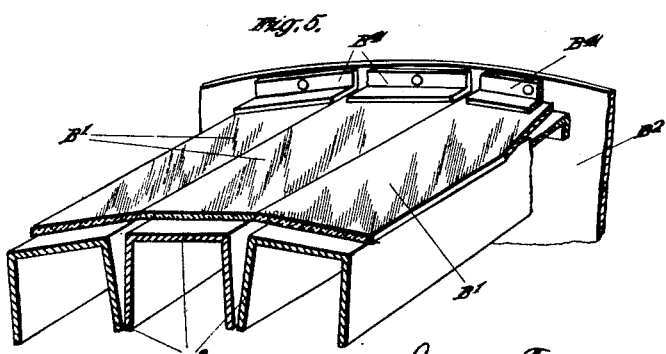

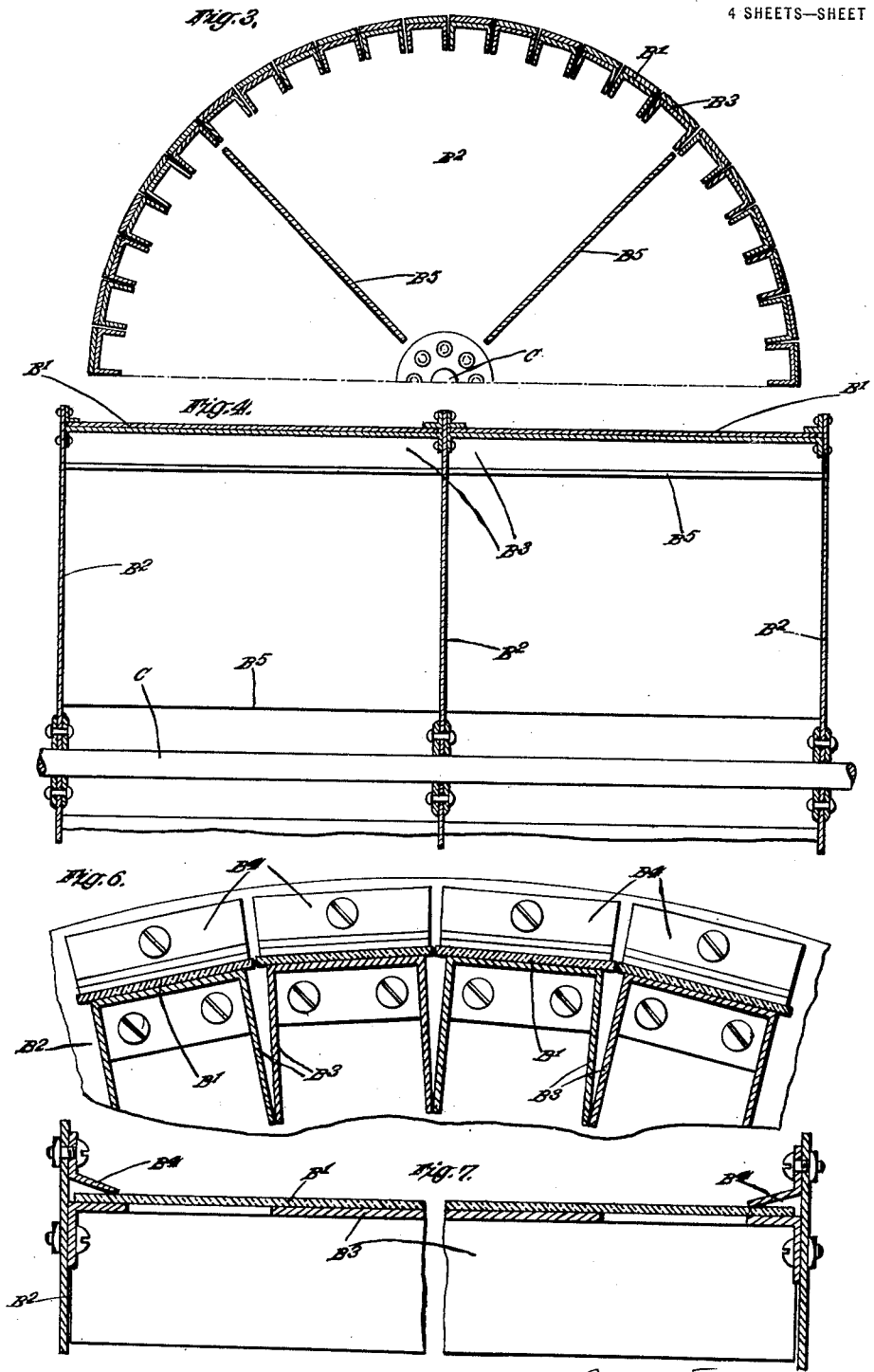

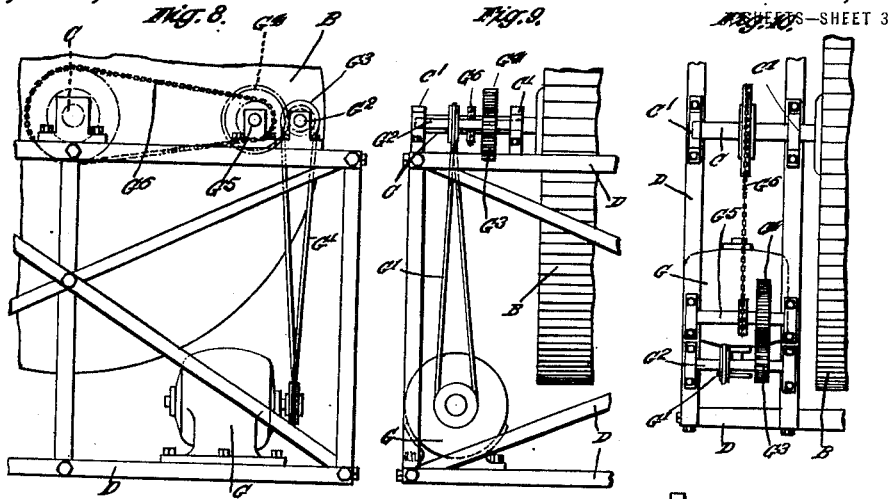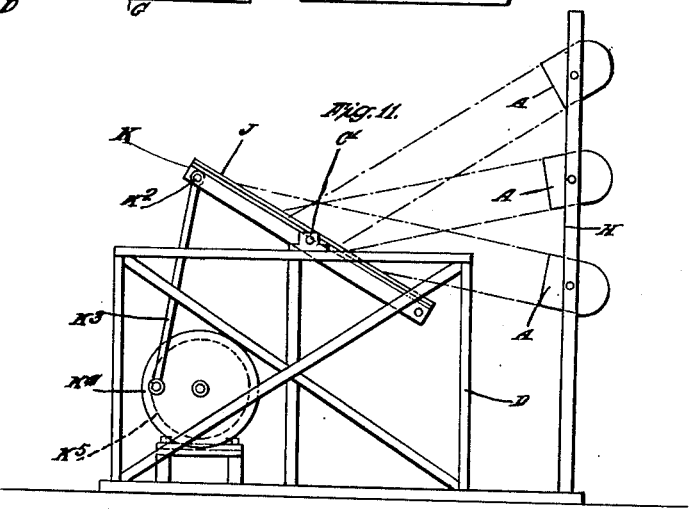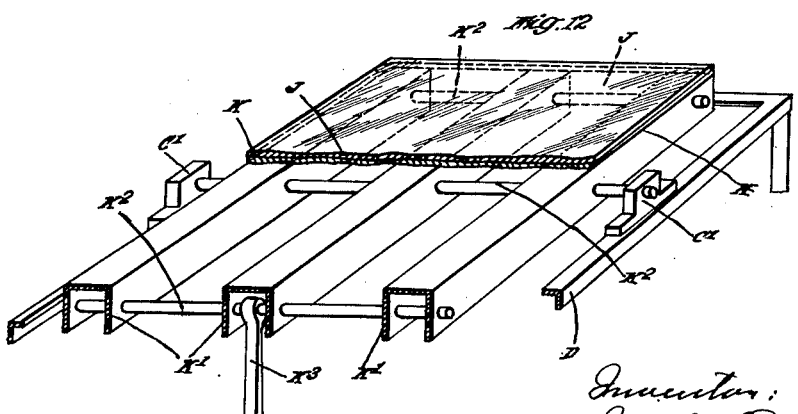

J. T. ROBIN.
PROJECTION OR DISTRIBUTION OF LIGHT.
APPLICATION FILED SEPT. 14, 1918.
1,400,990.
Patented Dec. 20, 1921.
4 SHEETS—SHEET 4.
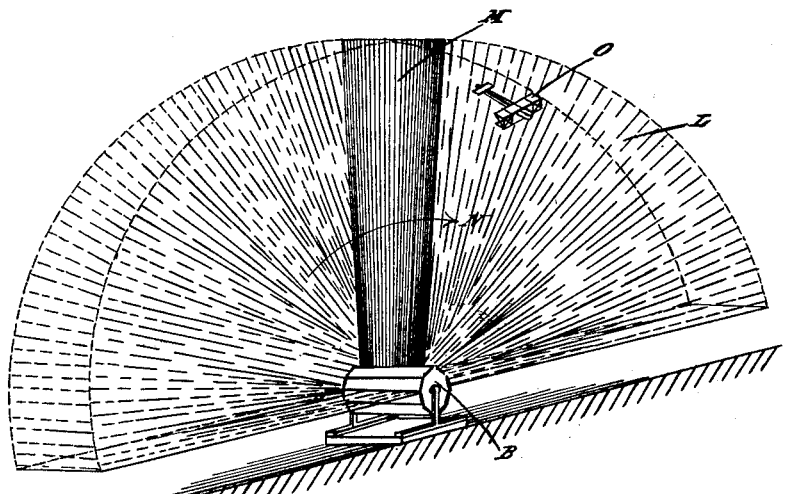
Fig. 13.
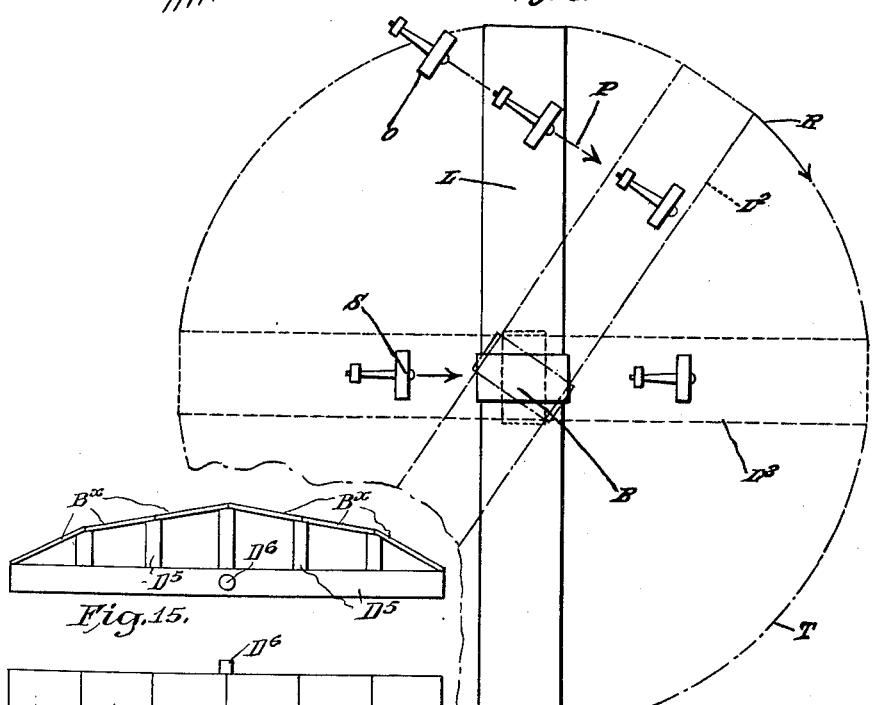
Fig. 14.
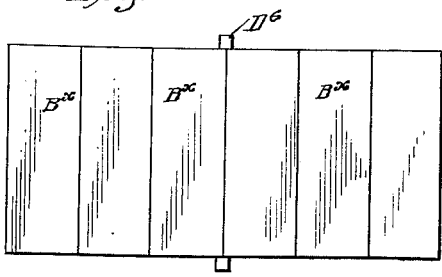
Fig. 15.
Fig. 16.
Inventor,
Joseph T. Robin

UNITED STATES PATENT OFFICE.

JOSEPH THEODORE ROBIN, OF STREATHAM, LONDON, ENGLAND.

PROJECTION OR DISTRIBUTION OF LIGHT.

1,400,990.   Specification of Letters Patent.   Patented Dec. 20, 1921.

Application filed September 14, 1918. Serial No. 254,113.

*To all whom it may concern:*

Be it known that I, JOSEPH THEODORE ROBIN, a subject of the King of Great Britain, residing at Woodmuir, 38 Tooting Bec Gardens, Streatham, in the county of London, England, have invented certain new and useful Improvements in or Relating to the Projection or Distribution of Light, of which the following is a specification.

This invention relates to a method of and apparatus for projecting or distributing light, and it is particularly intended to enable searchlights to be used more effectively than at present for naval and military purposes especially in connection with the location of hostile aircraft. The present method of employing searchlights disposed at various widely separated points for locating or "picking up" hostile aircraft is not entirely satisfactory, as it is very difficult with the several separate searchlight beams moving or searching in different directions to locate an aircraft flying at a great height and the finding of the aircraft by this method is to a large extent dependent upon chance, and even if an aeroplane be located by a searchlight beam it can fairly easily escape owing to its mobility. It is therefore the chief object of my invention to reduce the element of chance in locating aircraft, by providing an extensive and efficient illuminating area or zone which will enable an aircraft to be comparatively easily detected and "held."

According to this invention, the illuminating area or zone is produced by projecting or reflecting several beams of light from a suitable position or source and moving the said beams in the same path which becomes the illuminating area or zone, the number and intensity of the beams and the speed of movement being such in relation to the said path that the intensity of the illuminating area is sufficient to enable an aircraft in the path of movement and intermittently illuminated by the moving beams, to appear constantly or continuously illuminated owing to persistence of vision; or the speed of movement may be less than that required to produce the apparent constant or continuous illumination of the aircraft, so that rapid intermittent illumination of the aircraft can be observed. During the movement of the several beams and the consequent production of the illuminating area or zone, the angular position or direction of the illuminating area or zone may be changed or varied for the purpose of searching for an aircraft flying in the vicinity of the illuminating area or zone or for following or "holding" an aircraft immediately it has been observed in the illuminating area or zone. Owing to the extensive field or area covered by the moving beams, the illuminating area is of very considerable dimensions compared with the beam of light from a single searchlight and owing to the movement which can be imparted to the illuminating area, to change its angular position or direction, an aircraft within the range of movement of the illuminating area can be readily located by angularly moving or varying the direction of the illuminating area. Further, owing to the capability of changing the angular position or direction of the illuminating area, an aircraft once located cannot easily escape by maneuvering such as it would do to escape from a single searchlight beam as if it should succeed in penetrating the illuminating area, the latter can be practically instantaneously moved to again locate the aircraft before it has had time to fly or maneuver so as to be out of the range of movement of the illuminating area.

The apparatus which I provide for the purpose of this invention may comprise several searchlights arranged to direct their light onto a movable reflecting device in such a manner that the reflected moving beams of light move in the same path to produce the illuminating area as aforesaid. The arrangement of the searchlights relatively to the reflecting device may vary according to the form of illuminating area or zone which is required, and the apparatus may be so constructed and operated as to enable the angular position or direction of the illuminating area to be changed for the purpose of searching for or following an aircraft as above set forth. In accordance with one construction of the apparatus, the illuminating area may be in the form of a substantially vertical sector-light zone of light produced by the beams moving in a vertical path and the angular position of the illuminating area so produced can be changed by angularly moving the apparatus around a vertical axis when desiring to search for or follow an aircraft. According to another construction of the apparatus it may be such as to produce an illuminating area in the form of a cone or part of a cone the degree of conicity of which may be varied when searching for or following an aircraft.

The movable reflecting device may be adapted to rotate or oscillate and may comprise a number of reflecting surfaces so arranged that the light from each searchlight is reflected into several beams and when several searchlights are employed a considerable number of beams can be reflected so as to be moved in the same path thereby enabling the reflecting device to be moved at a slow speed in order to produce the apparent continuous illumination, due to persistence of vision. The intensity of the illuminating area can be made equal to or greater than the intensity of a single stationary searchlight beam by providing a suitable number of searchlights and thus augmenting the initial source of light the number required varying according to the size of the area to be produced thus to produce a large illuminating area of a certain intensity more searchlights would be required than would be necessary to produce a smaller illuminating area of the same intensity. Although in some cases it may be preferred to move the reflecting device at such a speed that an aircraft appears to be continuously illuminated owing to persistence of vision, it may be desirable under some conditions to reduce the speed so that the intermittent illumination of the aircraft by the moving beams can be observed thus producing a kind of flickering effect. From experiments which I have made I find that the flickering effect enables an object in the illuminating area to be very quickly observed and moreover, it is likely to be disconcerting to the occupants of an aircraft. Although I have specified the use of the apparatus as applied to the location of aircraft, it is capable of analogous or other uses for which ordinary searchlights are generally employed. At the present time it is convenient and expedient to use a number of existing searchlights but I may provide any equivalent source of light such as a single unit producing several beams of light equal in intensity to searchlight beams, the unit being so arranged relatively to the reflecting device as to produce an efficient illuminating area when the reflected beams of light are moved in the same path. Thus the expression "a number of searchlights" used throughout the specification and claims is intended to include any equivalent arrangement. It is desirable to employ searchlights of maximum power for the purpose of this invention, but it is feasible to employ searchlights of less power which may be regarded as obsolete in view of the searchlights of higher power in which case a larger number would be required to produce an illuminating area of the same size and intensity as that produced by the searchlights of maximum power. There is strictly no limit to the number of searchlights which may be employed as long as they can be so arranged relatively to the reflecting device that the beams move in the same path as the greater the number used, the more efficient will be the illuminating area, but the number required to produce an illuminating area of a given size and intensity is less than would be required to produce the illuminating area of the same size and intensity by stationary beams projected by suitably grouped searchlights.

The foregoing description of the apparatus refers particularly to the production of an illuminating area or zone suitable for locating aircraft flying at high altitudes. In cases of locating aircraft which fly low an apparatus similar to the above but comprising say only one searchlight may be used providing the light therefrom divided up into a number of beams as aforesaid. If a plane oscillatory reflector be used, several searchlights are employed to produce a number of moving beams.

In order that the invention may be clearly understood and readily carried into effect, I will describe the same more fully with reference to the accompanying drawings, in which:—

Figure 1 is a diagram showing one construction of the apparatus, comprising several searchlights and a rotary reflecting device in the form of a horizontally arranged drum having a polygonal reflecting surface.

Fig. 2 is a diagram of another construction of the apparatus employing a reflecting device similar to that used in the construction shown in Fig. 1, but vertically arranged instead of horizontally.

Figs. 3 and 4 are respectively a transverse sectional view and a longitudinal sectional view of one construction of the reflecting device or drum.

Figs. 5, 6 and 7 are detail views illustrating one arrangement for retaining the reflectors on the reflecting device or drum.

Figs. 8, 9 and 10 are respectively an end view, a side view, and a plan illustrating one arrangement of the mechanism for rotating the reflecting device or drum, when arranged in a horizontal position.

Fig. 11 is a diagram showing one construction of the apparatus employing an oscillating reflecting device.

Fig. 12 is a sectional perspective view of one construction of the oscillating reflecting device.

Figs. 13 and 14 are explanatory diagrams hereinafter referred to.

Figs. 15 and 16 are, respectively, an end elevation and plan of a slightly modified form.

In the example shown in Fig. 1, A, A represent the searchlights and B represents the reflecting device in the form of a rotary horizontally arranged drum having a number of strip or flat reflectors or mirrors B' around its periphery so as to provide a polygonal reflecting surface. The drum shown in Figs. 3 and 4 is composed of three disks B² of sheet metal secured to an axle C which is supported in bearings C' on a frame D of suitable shape, which may be rectangular as indicated in Figs. 8, 9 and 10, and composed of angle iron. The aforesaid reflectors or mirrors B' are arranged longitudinally between the disks B² so as to be parallel to the axis of the drum and as shown in Figs. 5, 6 and 7 may be supported on light channel shaped supports B³ which are secured at their ends to the disks B², the mirrors B' being retained in position on their supports B³ by resilient or spring clips B⁴ secured to the disks B² and adapted to bear on the ends of the mirrors or reflectors B' as shown in Figs. 5 and 7. Thus the drum is provided with a polygonal reflecting surface constituted by the several mirrors B' and any one of the mirrors may be readily removed and substituted by another without interfering with the remaining mirrors. Longitudinal members or plates B⁵ are provided between the disks B² to impart rigidity to the drum (see Figs. 3 and 4).

In order to effect the rotation of the drum B an electric motor G (see Figs. 8, 9 and 10) which is supplied with current from a suitable source, is carried on the frame D and by means of a driving belt G' passing around a pulley on a shaft G² imparts rotation to the latter which also carries a gear wheel G³ in mesh with the gear wheel G⁴ on a shaft G⁵ that is operatively connected to the axle C of the drum B by a sprocket chain G⁶ passing around sprocket wheels of the shaft G⁵ and the drum axle C.

The searchlights A may be mounted in any convenient manner on suitable supports such as H see Fig. 1 which form part of or are secured to the structure H', H² on which the frame D supporting the drum B is mounted, the structure carrying the searchlights and the drum being provided with rollers or wheels E for enabling it to be angularly moved on a circular track F around a vertical axis passing through the middle of the drum. The searchlights as shown are superposed in two groups and are all arranged in the same vertical plane so that the beams of light can be directed onto the upper surface of the drum. Instead of or in addition to the searchlights arranged as shown, other searchlights may be mounted above the drum on suitable cross supports so that all the searchlights are disposed in the same vertical plane and all direct their beams onto the upper surface of the reflecting drum; the relative arrangement and the searchlights and the reflecting drum being such that the searchlights are not disposed in the path of the beams reflected from the drum, this being accomplished by supporting the shaft or axle of the drum at a slight inclination to the horizontal. By reason of the several reflectors, the beam from each searchlight is divided or split up into a number of beams and the various beams of light reflected by the reflecting drum are directed upwardly and are all disposed in the same zone which may be approximately vertical.

By rotating the drum the several reflected beams move in the same path which becomes the illuminating area which is in the form of a substantially vertical sector like zone as shown diagrammatically in Fig. 13. It is not essential that the sector like zone should be of half disk form as indicated in Fig. 13 as by suitably arranging the searchlights a sector like zone forming an angle of say about 120 degrees between the outside beams may be provided instead of forming an angle of approximately 180 degrees as shown in Fig. 13; any convenient angle may however be formed. By providing a suitable number of searchlights and dividing up the beams from the same as aforesaid, it is only necessary to rotate the drum at a very slow speed in order to enable an aircraft in the path of movement of the beams to appear continuously illuminated by persistence of vision, and the intensity of the illuminating area produced by the moving beams can be rendered efficient for the purpose in view by employing a suitable number of searchlights. The arrangement may be such that a speed say of five to ten revolutions of the drum per minute will be sufficient to cause an aircraft in the path of movement to appear continuously illuminated owing to persistence of vision. If the speed of movement be slightly reduced so that the persistence of vision effect is not obtained, the aircraft can be observed as an intermittently illuminated body, and this intermittent illumination will produce the flickering effect which as aforesaid may be useful in enabling aircraft to be quickly detected when in the illuminating area. It will be understood that during the rotation of the drum B and the consequent production of the illuminating area in the manner aforesaid, the frame or structure carrying the searchlights and the reflecting drum can be angularly moved around a vertical axis on the track F so as to change the angular position of the illuminating area as indicated in Fig. 14 when searching for or following an aircraft. The diagrams shown in Figs. 13 and 14 will be hereinafter more fully explained.

In the construction shown in Fig. 2 the vertically disposed rotary reflecting drum B is employed in conjunction with a number of searchlights arranged in circular fashion around the drum so as to direct their beams of light onto the polygonal reflecting surface from which the beams are reflected at the same angle relatively to the vertical axis of the drum. Only two searchlights are shown in this figure which represents a diagrammatic elevation of the arrangement, but it will be understood that several searchlights may be disposed wholly around the drum to enable an illuminating area or zone in the form of an inverted cone to be obtained when the drum is rotated. The degree of conicity of the illuminating area may be varied by vertically moving the drum B and simultaneously altering the angular position of the searchlights, and for this purpose the drum may be mounted on the platform H$^x$ which is counter balanced by weights H$^3$ on cords H$^4$ passing around pulleys H$^5$ so that the platform H and the drum B will remain in any adjusted position. The searchlights A may be connected to the platform H$^x$ by suitable links or rods so that their angular position is correspondingly altered when the platform is raised or lowered. The degree of conicity may in some cases be varied by altering the angular position of the searchlights without vertically moving the drum. By varying the conicity of the illuminating area and thus altering the angular position or direction of the path of movement of the beams, it is possible to search for an aircraft or to follow the same when once it has entered the illuminating area.

Instead of forming a complete cone by arranging searchlights entirely around the drum, a number of searchlights may be arranged so that the beams are directed onto any required part of the polygonal surface of the reflecting drum, thus enabling a partial cone to be produced, the angular position or conicity of which may be varied in the manner aforesaid. In such an arrangement the whole structure carrying the drum and the searchlights may be angularly moved around a vertical axis passing through the center of the drum, so as to change the direction or position of the illuminating area when searching for or following an aircraft. The searchlights may be so arranged with respect to the vertically disposed drum that a horizontal illuminating area in the form of a disk or partial disk may be produced, such an arrangement being useful for searching or illuminating purposes, either on sea or land.

In the modification shown in Fig. 11 an oscillating reflector K is employed in conjunction with a number of superposed searchlights supported in the same plane on suitable supports H which may form part of an angularly movable structure carrying the reflecting device. In the example shown, a single or plane reflector J is supported in any suitable manner on a table K (see Fig. 12) comprising three light channel shaped members K' supported by transverse tubular rods K$^2$, the middle of which is prolonged on each end and is mounted in bearings C' on the frame D. The table K is adapted to be rocked or oscillated in bearings by means of a connecting rod K$^3$ secured to one of the end rods K$^2$ and to the fly wheel K$^4$ of an electric motor K$^5$. The rotation of the electric motor will impart the desired rocking or oscillating movement to the table and reflector, to cause the reflected beams of light to produce a vertical sector like zone. When a plane reflector such as shown is employed, it is desirable to employ as large a number of searchlights as is feasible to produce a considerable number of reflected beams which all move in the same path when the reflector is oscillated. Instead of employing a plane reflector, it will be understood that a number of reflectors may be provided and arranged parallel to the axis of oscillation that the beam of light from each searchlight is divided up into several beams, all the various reflected beams being directed into the same zone for the purpose set forth. Such an arrangement is illustrated in Figs. 15 and 16. In this embodiment of the invention the reflectors B$^x$ are supported by a suitable frame D$^5$, which is provided with laterally projecting trunnions or lugs D$^6$ constituting an axis about which it may be rocked.

The throw of the connecting rod K$^3$ shown in Fig. 11 may be variable by making the rod adjustable to vary its length and its point of connection with the fly wheel may also be adjusted according to requirements.

The illuminating area produced by this arrangement is somewhat similar to that which can be produced by an arrangement shown in Fig. 1 and by angularly moving the structure comprising or carrying the searchlights on the oscillatory reflecting device, the angular position or direction of the illuminating area can be varied as required for searching or following an aircraft.

Fig. 13 is a diagrammatic perspective view showing an illuminating area L in the form of a substantially vertical semi-disk or sector-like zone such as would be produced by an apparatus similar to that illustrated in Fig. 1 which embodies a horizontal reflecting drum B and suitably arranged searchlights which are not shown in Figs. 13 and 14 for convenience of illustration. As previously explained, the construction of the apparatus shown in Fig. 11 can be arranged to produce a vertical or sector-like zone and the following description applies to both the modifications shown in Figs. 1 and 11. M indicates one of a number of beams of light projected from the reflecting device or drum and the arrow N may represent the direction of rotation of the drum when such is employed while in the case of the oscillatory reflector the several beams oscillate or move backward and forward in the same path to produce the sector like zone. The path of movement (illustrated by the dotted lines) of the several beams M becomes the illuminating area and supposing an aeroplane O were to cross the path of movement that is the illuminating area it would be illuminated while passing through the same either apparently continuously due to persistance of vision or intermittently according to the speed of movement of the reflecting device. Fig. 14 is a diagrammatic plan view of the sector like illuminating area shown in Fig. 13. Should the aeroplane O flying in the direction of the arrow P pass through the illuminating area, the apparatus comprising the reflecting device and the searchlights may be angularly moved around a vertical axis as previously explained in the direction of the arrow R to change the angular position or direction of the illuminating area until it locates the aircraft as shown by the position $L^2$ indicated by the dot and pick lines. If an aeroplane S were to cross the illuminating area directly above the reflecting device the apparatus would be turned around a vertical axis to an angle of 90 degrees so that the illuminating area would be in the position $L^3$ shown by the broken lines whereupon the aeroplane would be located as shown. The movement of the apparatus around the vertical axis may be effected either in the direction of the arrow R or in the opposite direction so that the illuminating area can assume any angular position in the circular movement. It will therefore be understood that if an aircraft be within the range of movement say within the circle T the illuminating area can be moved around the vertical axis either continuously in one direction or as required in either direction to search for the aircraft and upon the aircraft being located in the illuminating area the latter may be moved to follow the aircraft. Should the aeroplane escape for the time being from the illuminating area the apparatus can be readily moved to again search for the same and it will be readily observed before it has had time to travel out of the range of the apparatus. Owing to the extensive area which can be covered by the illuminating area it is extremely difficult for an aircraft to escape once it has entered the effective range of the apparatus. When the apparatus comprises a vertically arranged reflecting device and searchlights so arranged as to produce an illuminating area in the form of part of a cone, it may be angularly moved as previously explained so that the position of the illuminating area may be changed for enabling the aircraft to be located in a somewhat similar manner to that described in connection with Figs. 13 and 14 and in addition the degree of conicity may be varied as required.

When the searchlights are arranged around the drums to produce an illuminating area in the form of a complete cone it is not necessary to angularly move the apparatus as by varying the degree of conicity, the direction of the area can be changed for searching or for following an aircraft.

What I claim and desire to secure by Letters Patent of the United States is:—

1. Apparatus for producing an illuminating area or zone for the location of aircraft comprising several powerful light projectors such as searchlights for producing a number of pencils or beams of light of high intensity, means whereby the beams are directed upwardly in the same zone or angular position, and means for causing the beams to move in the same definite path or zone at such speed in relation to the size of the area or zone to be illuminated as to enable an object in the said path or zone to appear constantly illuminated owing to persistence of vision or at a slightly less speed to enable the object to be very rapidly illuminated to produce a flickering effect.

2. Apparatus for producing an illuminating area or zone for the location of aircraft comprising a number of searchlights whose beams are directed upwardly in the same zone or angular position, means for moving the beams in a definite path or zone to produce an illuminating area, and means for changing the angular position or direction of the illuminating area during the movement of the beams.

3. Apparatus for producing an illuminating area or zone comprising a large number of searchlights, the number being selected according to the size or area of the zone to be illuminated, means for splitting up each searchlight beam into a number of beams to produce a very considerable number of beams closely arranged in radial or approximately radial disposition, and means adapted to be moved at a slow speed to cause the beams to partake of such movement in the same path or zone as to produce an illuminating area in which an object will appear continuously illuminated or illuminated with a flickering effect.

4. Apparatus for producing an illuminating area or zone comprising a large number of searchlights, the number being selected according to the size or area of the zone to be illuminated, means for splitting up each searchlight beam into a number of beams to produce a very considerable number of beams closely arranged in radial or approximately radial disposition, means adapted to be moved at a slow speed to cause the beams to produce an illuminating area in which an object will appear continuously iluminated or illuminated with a flickering effect, and means for angularly moving the entire apparatus to change the direction of the illuminating area for enabling an object to be "spotted" and held.

5. Apparatus for producing an illuminating area or zone comprising a large number of searchlights and a movable reflecting device, the searchlights being so arranged that the several beams therefrom are reflected in close proximity in the same zone or plane, and means for moving the reflecting device whereby the beams move in a definite path or zone to produce an illuminating area.

6. Apparatus for producing an illuminating area or zone comprising a large number of searchlights and a movable reflecting device, the searchlights being so arranged that the several beams therefrom are reflected in close proximity in the same zone or plane, means for moving the reflecting device whereby the beams move in a definite path or zone to produce an illuminating area, and means for changing the angular position of the whole apparatus comprising the searchlights and the reflector in order to vary the angular position or direction of the illuminating area.

7. Apparatus for producing an illuminating area or zone comprising a large number of searchlights, a movable reflecting device having a considerable number of reflecting surfaces, means for supporting the searchlights in such position that the beams are directed onto a certain portion of the reflecting device whereby each beam is divided or split up into a number of closely arranged beams, and means for imparting movement to said reflecting device to cause the closely arranged beams to partake of such movement as will produce an area of illumination in which any object will appear to be continuously illuminated owing to persistence of vision.

8. Apparatus for producing an illuminating area or zone, comprising a frame or structure, a number of searchlights supported by said frame, and a mvoing reflecting device adapted to produce a plurality of moving beams which travel in the same zone, and adapted to be moved to change the angular position or direction of the illuminating area provided by the moving beams.

9. Apparatus for producing an illuminating area or zone, comprising a substantially horizontal reflecting device, a number of searchlights arranged to direct their rays of light onto the upper part of the reflecting device so that the beams of light reflected by the said device are directed upwardly, and means for moving the reflecting device and causing the reflected beams to move in a definite zone to produce the illuminated area, substantially as described.

10. Apparatus for producing an illuminating area or zone comprising a substantially horizontal reflecting device, a number of searchlights arranged to direct their rays of light onto the upper part of the reflecting device so that the beams of light reflected by the said device are directed upwardly, means for moving the reflecting device and causing the reflected beams to move in a definite zone to produce the illuminated area, and means for moving the reflecting device around a vertical axis to change the angular position or direction of the illuminating area.

11. Apparatus for producing an illuminating area or zone comprising a movable reflecting device having a number of narrow plane reflecting surfaces arranged parallel to the axis about which the device is movable, a number of searchlights in close proximity to said reflecting device and so arranged that the pencils or beams of light from the searchlights are directed onto and overlap on the reflecting surfaces whereby a considerable number of closely arranged beams are disposed radially or approximately radially, and means for moving the reflecting device about its axis to cause the large number of beams to move in a definite path to distribute the light rays over the said path or zone in which any object will appear to be continuously illuminated according to the speed at which the reflecting device is moved.

12. Apparatus for producing an illuminating area or zone comprising a support having horizontal and vertical members, searchlights mounted on said horizontal and vertical members, a polygonal reflecting device onto which the beams from the various searchlights are directed and divided or split up into a number of reflected beams in the same path or zone, means for moving the said reflecting device to produce an illuminating area, and means for moving the same frame or structure with the reflecting device about a vertical axis.

JOSEPH THEODORE ROBIN.